(12) United States Patent
Weisenberg et al.

(10) Patent No.: US 10,837,589 B2
(45) Date of Patent: Nov. 17, 2020

(54) TAPING APPARATUS, SYSTEM AND METHOD FOR PIPE LINING APPLICATIONS

(71) Applicant: Sipp Technologies, LLC, Wichita, KS (US)

(72) Inventors: Kent Weisenberg, Fruit Cove, FL (US); Ibrahiim Syed, Jacksonville, FL (US)

(73) Assignee: SIPP TECHNOLOGIES, LLC, Wichita, KS (US)

(*) Notice: Subject to any disclaimer, the term of this patent is extended or adjusted under 35 U.S.C. 154(b) by 99 days.

(21) Appl. No.: 15/971,828

(22) Filed: May 4, 2018

(65) Prior Publication Data

US 2018/0326679 A1    Nov. 15, 2018

Related U.S. Application Data

(60) Provisional application No. 62/504,068, filed on May 10, 2017.

(51) Int. Cl.

| | |
|---|---|
| *F16L 55/18* | (2006.01) |
| *F16L 55/44* | (2006.01) |
| *F16L 55/32* | (2006.01) |
| *B05B 12/26* | (2018.01) |
| *B29C 63/00* | (2006.01) |
| *B29C 63/30* | (2006.01) |
| *B29C 73/12* | (2006.01) |
| *F16L 101/18* | (2006.01) |
| *F16L 101/30* | (2006.01) |
| *B29L 23/00* | (2006.01) |

(52) U.S. Cl.
CPC .............. *F16L 55/18* (2013.01); *B05B 12/26* (2018.02); *B29C 63/0004* (2013.01); *B29C 63/30* (2013.01); *B29C 73/12* (2013.01); *F16L 55/32* (2013.01); *F16L 55/44* (2013.01); *B29L 2023/22* (2013.01); *F16L 2101/18* (2013.01); *F16L 2101/30* (2013.01)

(58) Field of Classification Search
CPC . F16L 55/18; F16L 55/32; F16L 55/44; F16L 2101/30; B29C 63/30
USPC ................. 138/97, 98; 405/150.1, 184.2
See application file for complete search history.

(56) References Cited

U.S. PATENT DOCUMENTS

| | | | | |
|---|---|---|---|---|
| 3,972,200 A | * | 8/1976 | Scarpi ............... | E21D 9/04 405/141 |
| 4,075,053 A | * | 2/1978 | Adams ............... | B31F 1/0093 156/391 |

(Continued)

FOREIGN PATENT DOCUMENTS

FR    2686678 A1    7/1993

OTHER PUBLICATIONS

Young, PCT International Search Report and Written Opinion, PCT/US2018/32009, dated Sep. 10, 2018.

*Primary Examiner* — James F Hook
(74) *Attorney, Agent, or Firm* — Thomas C. Saitta

(57) ABSTRACT

A taping apparatus adapted to apply tape over voids on an interior pipe wall, the taping apparatus having a transport assembly adapted to move the apparatus through a pipe; and a rotatable taping assembly adapted to retain a roll of tape and apply the tape over a void on the interior wall of the pipe, the taping assembly comprising an extendable and tractable arm assembly and a tape applicator assembly.

19 Claims, 6 Drawing Sheets

(56) References Cited

U.S. PATENT DOCUMENTS

| | | | | |
|---|---|---|---|---|
| 5,074,943 A | * | 12/1991 | Menzel | B29C 66/12421 |
| | | | | 156/195 |
| 5,348,801 A | * | 9/1994 | Venzi | B32B 27/12 |
| | | | | 428/354 |
| 6,234,226 B1 | * | 5/2001 | Kitahashi | F16L 55/1655 |
| | | | | 138/97 |
| 6,820,653 B1 | * | 11/2004 | Schempf | B08B 9/043 |
| | | | | 138/97 |
| 6,887,014 B2 | * | 5/2005 | Holland | B08B 9/049 |
| | | | | 104/138.2 |
| 8,678,043 B2 | * | 3/2014 | Emmons | F16L 55/1655 |
| | | | | 138/172 |
| 8,925,590 B2 | | 1/2015 | Khalifa et al. | |
| 2004/0013472 A1 | * | 1/2004 | Akimoto | F16L 55/1655 |
| | | | | 405/184.2 |
| 2007/0181244 A1 | * | 8/2007 | Billing | B65B 27/105 |
| | | | | 156/213 |
| 2011/0094659 A1 | * | 4/2011 | Zivanovic | F16L 55/1655 |
| | | | | 156/184 |
| 2011/0150575 A1 | * | 6/2011 | Brown | E21D 19/04 |
| | | | | 405/150.1 |

* cited by examiner

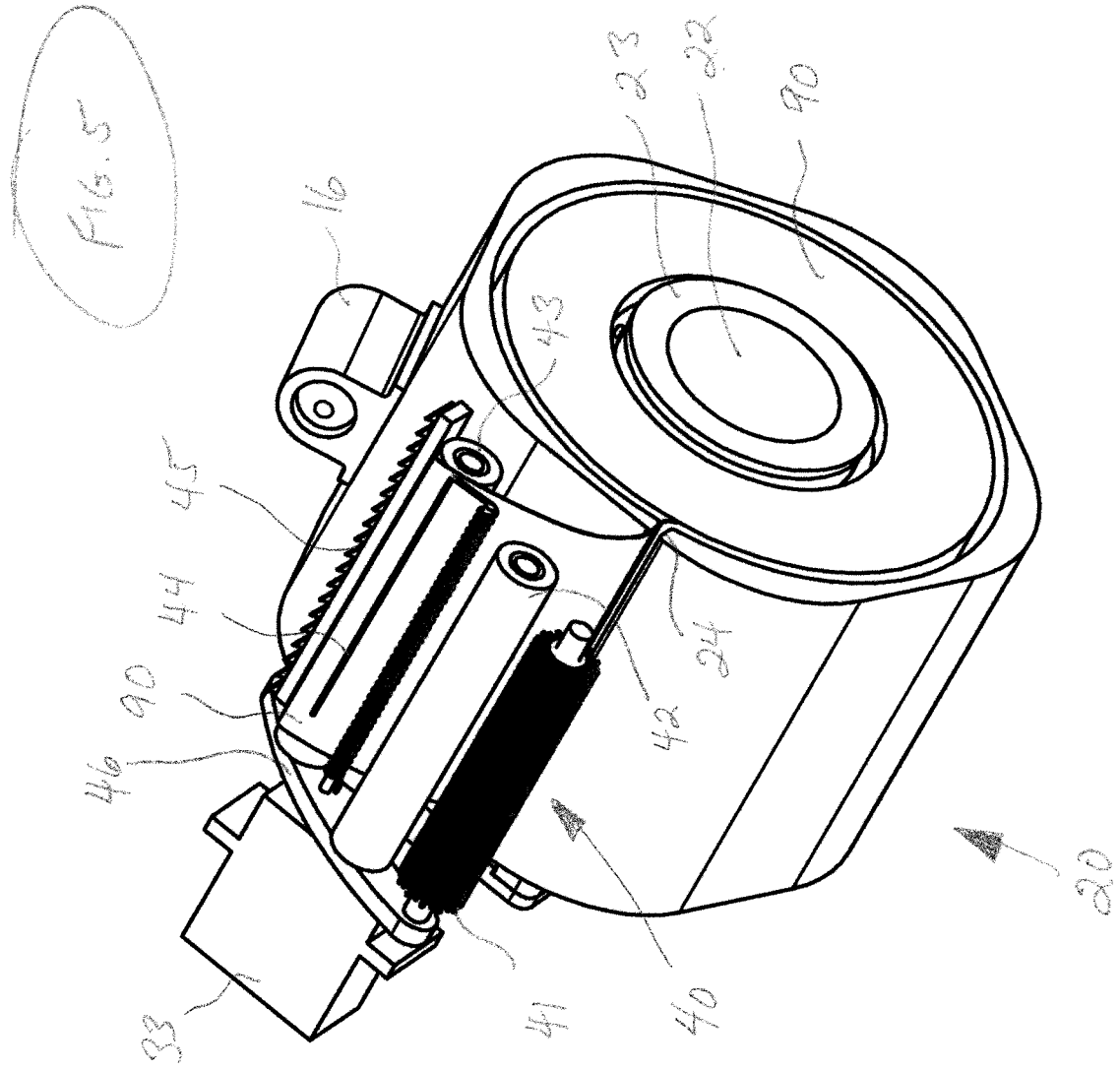

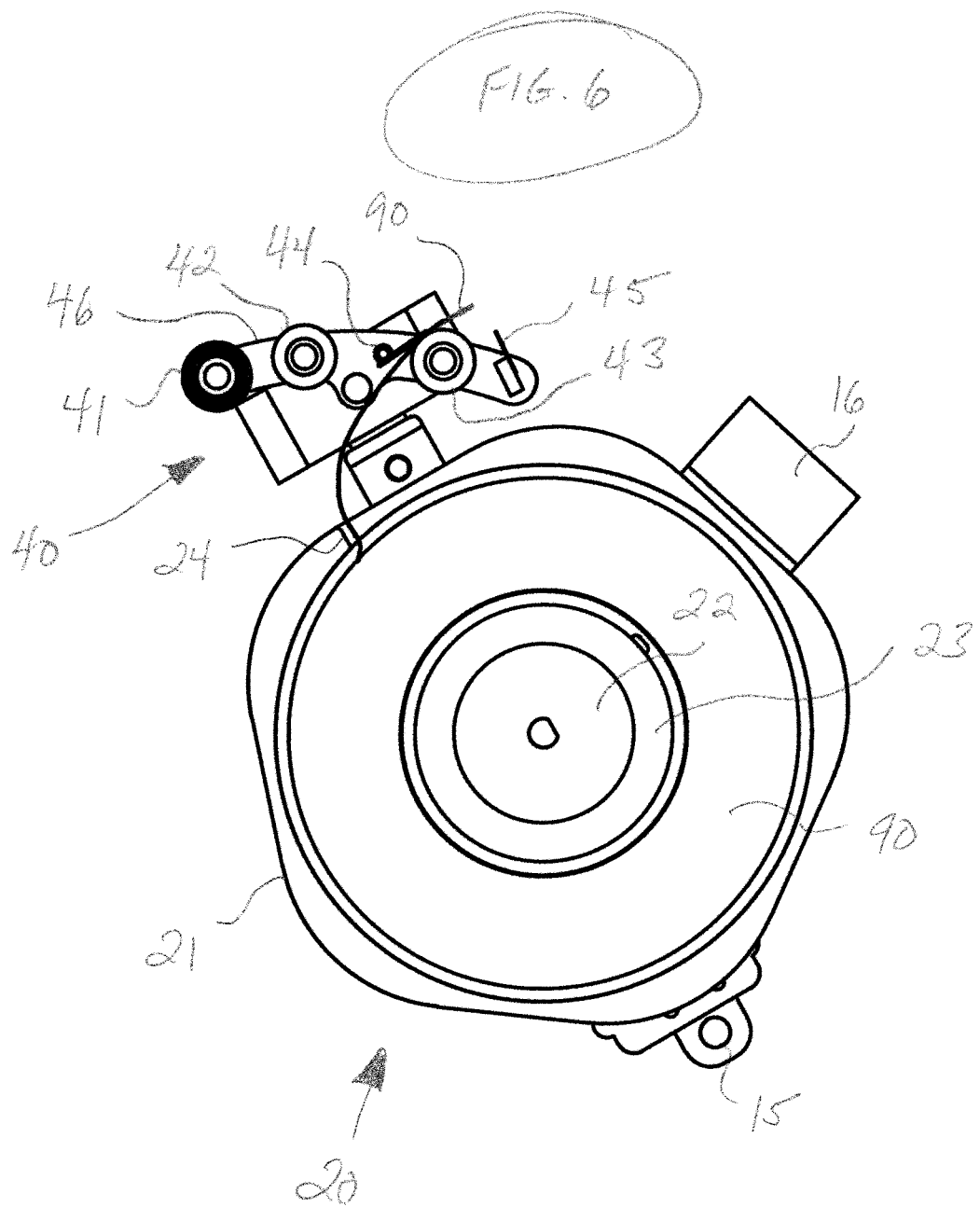

TAPING APPARATUS, SYSTEM AND METHOD FOR PIPE LINING APPLICATIONS

This application claims the benefit of U.S. Provisional Patent Application Ser. No. 62/504,068, filed May 10, 2017, U.S. Provisional Patent Application Ser. No. 62/620,171, filed Jan. 22, 2018, and U.S. Provisional Patent Application Ser. No. 62/635,794, filed Feb. 27, 2018, the disclosures of which are incorporated by reference herein.

BACKGROUND OF THE INVENTION

This invention relates broadly to the field of linings for internal pipe surfaces and methods of applying these linings, and more particularly relates to such linings adapted and adaptable for use in the structural repair or remediation of degraded, damaged or leaking pipes. In particular, the invention relates to Sprayed-In-Place-Pipe (SIPP) lining methods, systems and technologies. The invention most particularly relates in general to methods and apparatuses for temporarily covering or patching voids, i.e., cracks, perforations, depressions, joints or the like, when the SIPP process is performed, such that the voids are not underfilled or produce variations in lining thickness during application and curing of the SIPP liner material.

SIPP lining technology encompasses many different market sectors such as municipal water, industrial as well as governmental. In most of these markets the pipe systems will consist of mainlines that intersect with numerous smaller diameter pipe for feed lines, drains, monitoring instrumentation etc. Typically, the municipal water market—potable water transmission to homes—will always have these smaller pipe intrusions termed as service laterals or service leads or just services. Usually, these services have pipe diameters ranging from 0.5" to 1".

Fluid conveyance systems rely on the structural integrity of the pipe to safely and efficiently operate. In the municipal and industrial sectors, there are pipe systems that are degrading such that they fall below standards due to corrosion or crack propagation. These systems include for example the potable water transmission lines to residential areas which can range in sizes of 6 to 48 inches and will typically have complex networks that were installed and modified over many years as the neighborhoods were developed.

There are currently only a few methods to rehabilitate a pipe system to full structural integrity without excavating and replacing pipe segments. The current methods include Cast-In-Place-Pipe (CIPP) and Spray-In-Place-Pipe (SIPP). In the current SIPP methods, a SIPP spraying apparatus traverses the pipe by being pulled by an electrical and resin-supplying tether, known as the umbilical, or through robotic armatures. The spraying apparatus comprises a spinner member that ejects the lining material, such as an uncured or partially cured polymer resin, onto the inner diameter of the pipe, effectively creating a new pipe with a known thickness and structural properties inside the pre-existing pipe.

Currently in the SIPP industry the lining application method for class I and class II systems is to simply apply the lining across or over any voids (cracks, perforations, depressions, joints, etc.), which results in less than optimum coverage and liner thickness. Therefore, covering or patching the voids prior to applying the lining is desirable in the SIPP process. This would also hold true for Class III and IV or 'structural' lining applications.

It is an objective of this invention to provide an apparatus, system and method that addresses the problems described above regarding voids when using SIPP technology to remediate, rehabilitate or repair a mainline pipe. Such apparatus, system and method address these problems by providing an apparatus which patches the voids by applying short segments of adhesive surface tape over the cracks, perforations, depressions or joints as needed. It is a further object to provide such an apparatus including cameras to locate and identify the voids to be repaired and to provide evidence to an operator that a void has been successfully covered.

SUMMARY OF THE INVENTION

The purpose of the taping apparatus, system and method of the invention in various embodiments is to patch or cover voids, such as cracks, perforations, depressions, joints or similar imperfections present in the pipe wall, such that the inner surface of the pipe may be remediated by applying a SIPP or similar type inner coating, the taping of the voids resulting in better uniformity of thickness for the liner and eliminating the need to slow a liner robot to fill the voids during the lining process. Furthermore, patching the cracks also eliminates the fatigue failure associated with the concave lining profile inherently created when spraying a lining material over them, and inline gate valve seats can also be taped to prevent damage to the valves operational efficacy due to over-spray. The taping apparatus navigates through the mainline pipe, in a main embodiment under remote control of an operator, to locate a void and upon detection of a void, applies an adhesive tape patch over the void.

The taping apparatus is either self-powered or adapted to be pulled or pushed by a separate powered drive member or by retrieval of an umbilical cable, the taping apparatus having rolling members such as wheels, rollers, treads or the like for movement through the pipe. The taping apparatus comprises a transport assembly for movement of the apparatus though the pipe and a taping assembly comprising a rotatable drum housing which retains patching tape wound onto a spool and an extendable/retractable arm assembly mounted onto the rotating drum housing for application of the tape over a void. The arm assembly comprises a rocker bracket on which are mounted a cleaning member, such as a brush, a liquid absorbing member, such as a sponge, a press roller to apply pressure against the tape as it is placed onto the pipe wall, the tape being retrieved from the spool, a tape retainer member, such as a spring-biased rod, to retain the free end of the tape against the press roller, and a cutting member, such as a toothed blade, to cut the tape when the void is covered. A patching camera is positioned to provide visual information to the operator to facilitate the taping of the void.

In alternate language, the invention may be summarized as a taping apparatus adapted to apply tape over voids on an interior pipe wall, the taping apparatus comprising: a transport assembly adapted to move said apparatus through a pipe; a rotatable taping assembly adapted to retain a roll of tape and apply said tape over a void on the interior wall of the pipe, said taping assembly comprising an arm assembly and a tape applicator assembly. Furthermore, in such an apparatus, said taping assembly further comprising a drum housing, wherein said arm assembly is mounted to said drum housing and wherein said tape applicator assembly mounted to said arm assembly; said tape applicator assembly comprising a press roller, a tape retention member and a cutting member; said tape applicator assembly further comprising a rocker bracket, wherein said press roller, said tape retention member and said cutting member are mounted to said rocker bracket; said tape applicator assembly further comprising a cleaning member; said tape applicator assembly further comprising a liquid absorption member; wherein said arm assembly is extendable and retractable, said apparatus further comprising a drum motor adapted to rotate said taping assembly and an arm motor adapted to extend and retract said arm assembly; said arm assembly further comprising a bracket motor adapted to pivot said rocker bracket to cut said tape; further comprising a patch camera; and/or further comprising a navigational camera.

Also, a taping apparatus adapted to apply tape over voids on an interior pipe wall, the taping apparatus comprising: a transport assembly adapted to move said apparatus through a pipe, said transport assembly comprising rolling members mounted on a main body; a rotatable taping assembly adapted to apply tape over a void on the interior wall of the pipe, said taping assembly comprising a drum housing adapted to retain said tape on a spool, an extendable and retractable arm assembly and a tape applicator assembly mounted to said arm assembly, said tape applicator assembly comprising a rocker bracket and a press roller, tape retention member and cutting member mounted to said rocker bracket. Furthermore, in such an apparatus, said tape applicator assembly further comprising a cleaning member and a cutting member; further comprising a drum motor adapted to rotate said taping assembly and an arm motor adapted to extend and retract said arm assembly; said arm assembly further comprising a bracket motor adapted to pivot said rocker bracket to cut said tape; said taping assembly further comprising a patch camera; and/or further comprising a navigational camera.

Alternatively, a taping apparatus adapted to apply tape over voids on an interior pipe wall, the taping apparatus comprising: a transport assembly adapted to move said apparatus through a pipe, said transport assembly comprising rolling members mounted on a main body; a rotatable taping assembly adapted to apply tape over a void on the interior wall of the pipe, said taping assembly comprising a patch camera, a drum housing adapted to retain said tape on a spool, an extendable and retractable arm assembly and a tape applicator assembly mounted to said arm assembly, said tape applicator assembly comprising a rocker bracket and a press roller, tape retention member and cutting member each mounted to said rocker bracket; a drum motor adapted to rotate said taping assembly, an arm motor adapted to extend and retract said arm assembly, and a bracket motor adapted to pivot said rocker bracket to cut said tape; said apparatus further comprising a navigational camera. Furthermore, such an apparatus, wherein said rocker bracket is oriented circumferentially and curved, and wherein said press roller and said cutting member extend longitudinally from said rocker bracket.

Still alternatively, the invention is a method of applying tape over a void present on the interior wall of a pipe comprising the steps of: navigating a taping apparatus adapted to apply tape over voids on an interior pipe wall through a pipe, the taping apparatus comprising: a transport assembly adapted to move said apparatus through a pipe, said transport assembly comprising rolling members mounted on a main body; a rotatable taping assembly adapted to apply tape over a void on the interior wall of the pipe, said taping assembly comprising a patch camera, a drum housing adapted to retain said tape on a spool, an extendable and retractable arm assembly and a tape applicator assembly mounted to said arm assembly, said tape applicator assembly comprising a rocker bracket and a press roller, tape retention member and cutting member each mounted to said rocker bracket; a drum motor adapted to rotate said taping assembly, an arm motor adapted to extend and retract said arm assembly, and a bracket motor adapted to pivot said rocker bracket to cut said tape; said apparatus further comprising a navigational camera; locating a void; aligning said tape applicator assembly with said void; extending said tape applicator assembly and rotating said taping assembly such that said tape is pulled from said spool and applied over the void; pivoting said rocker bracket and cutting said tape; retracting said tape applicator assembly. Furthermore, the method wherein said step of locating said void and aligning said tape applicator assembly with said void is accomplished utilizing visuals produced by said patch camera and/or said navigational camera.

BRIEF DESCRIPTION OF THE DRAWINGS

FIG. 5 is a perspective view of the taping assembly of the embodiment of FIG. 1, as viewed from the transport assembly end, the transport assembly having been removed for clarity.

FIG. 6 is an end view of the taping assembly of the embodiment of FIG. 1, as viewed from the transport assembly end, the transport assembly having been removed for clarity.

DETAILED DESCRIPTION OF THE INVENTION

Figure 1:
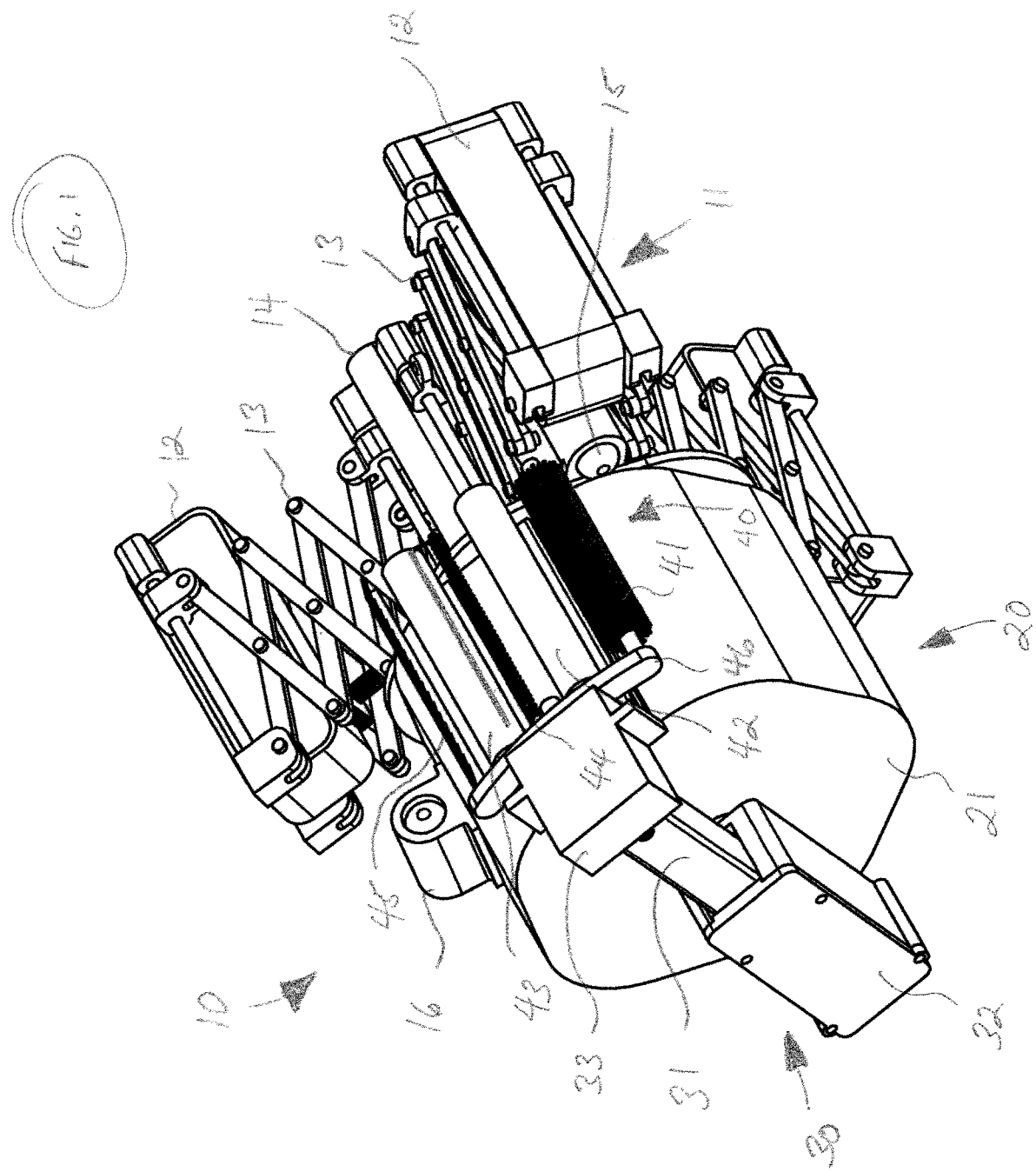
FIG. 1 is a perspective view of an embodiment of the taping apparatus as viewed from the taping assembly end.
Figure 2:
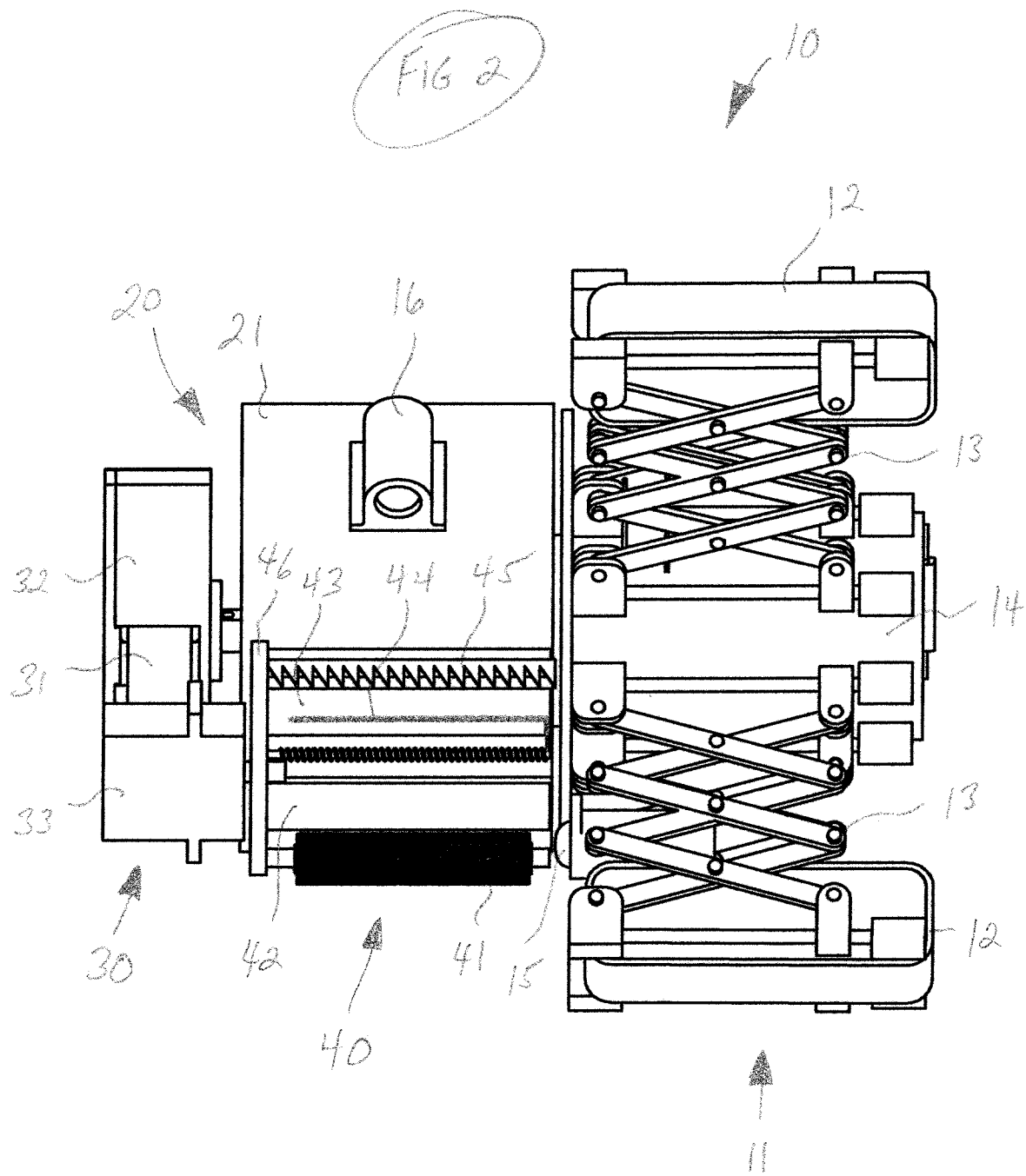
FIG. 2 is a side view of the embodiment of FIG. 1.
Figure 3:
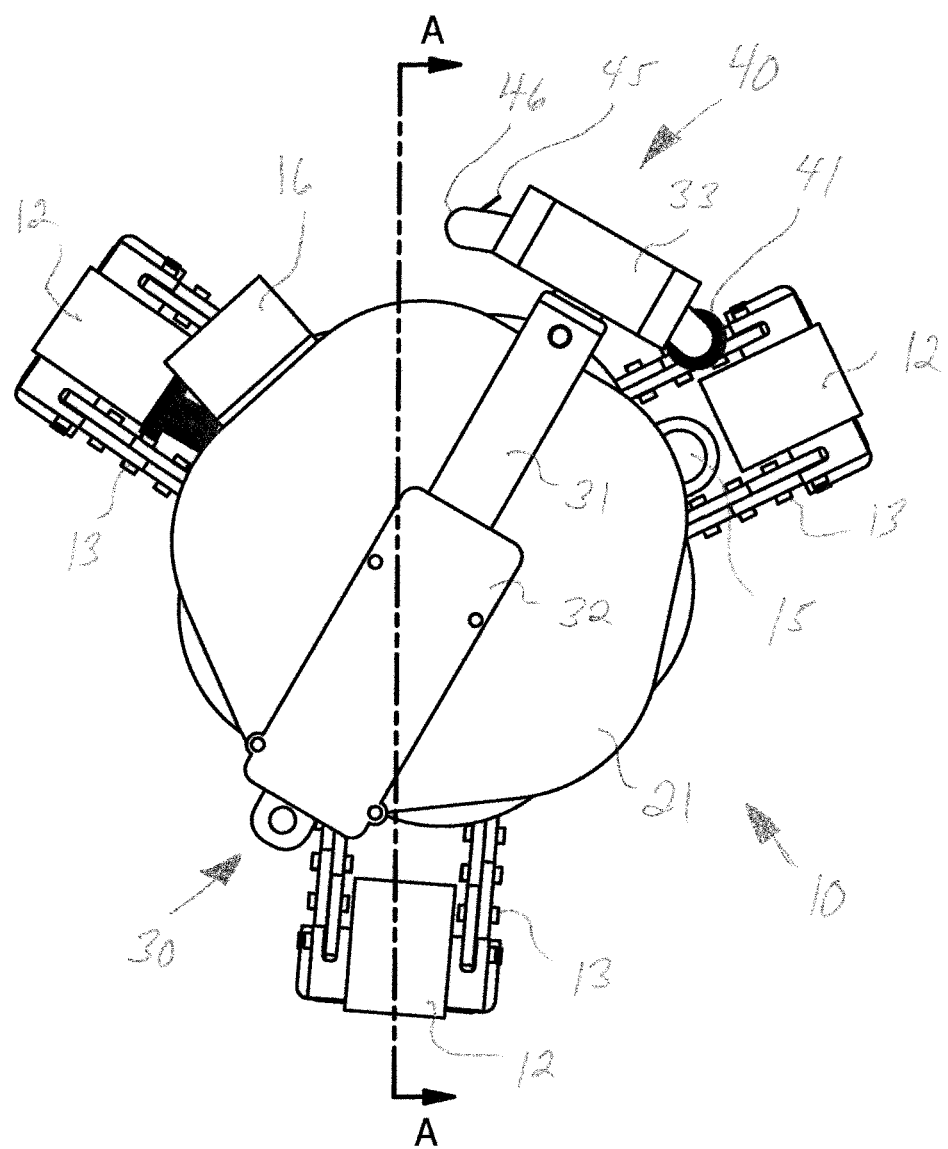
FIG. 3 is an end view of the embodiment of FIG. 1 as viewed from the taping assembly end.
Figure 4:
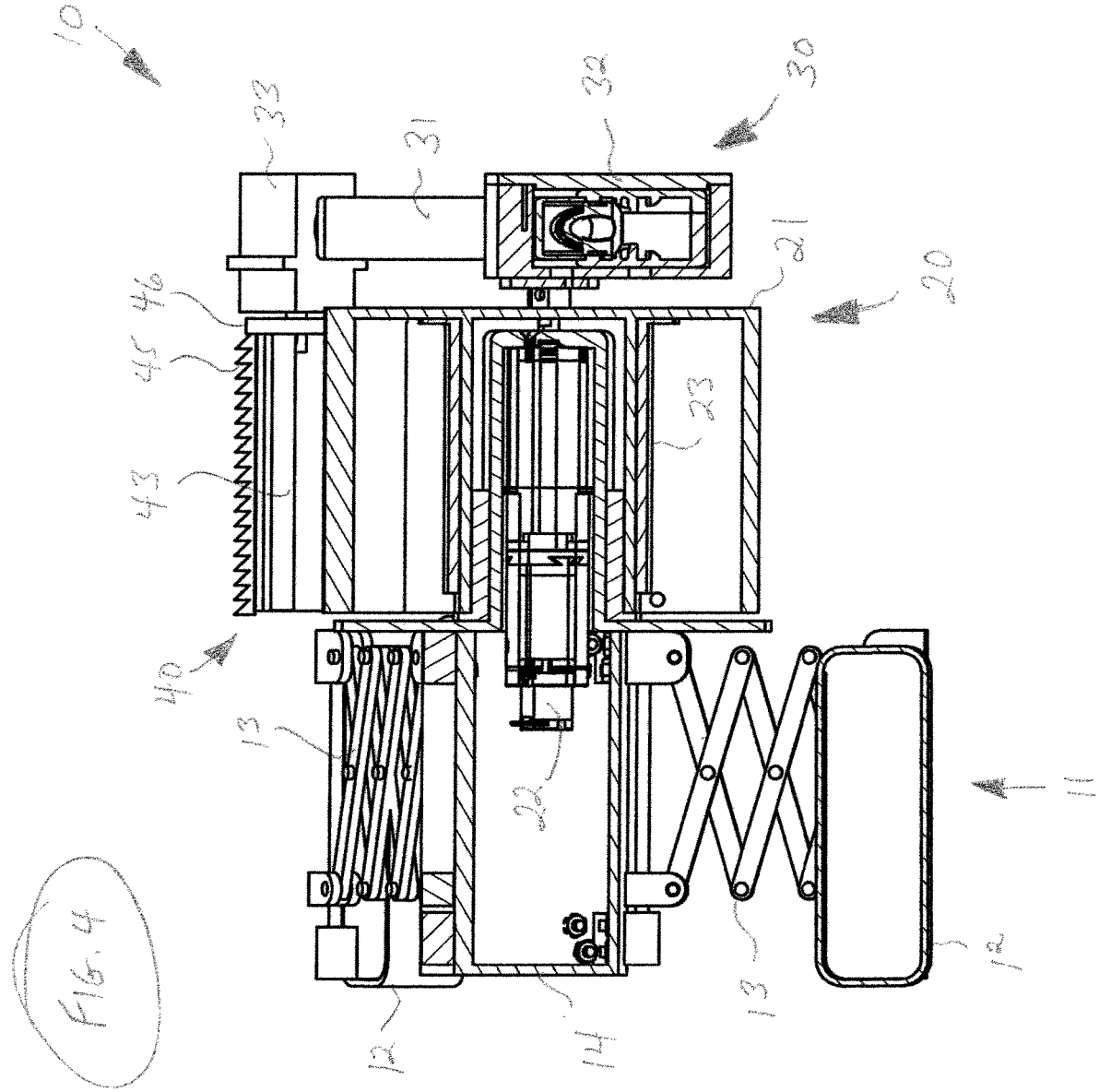
FIG. 4 is a longitudinal cross-sectional view of the embodiment of FIG. 1.

With reference to the drawings, which are meant to be non-limiting as to the scope of the invention and are not to scale, the invention is shown and described in various embodiments. In a broad sense, the invention is a patching or taping apparatus, system and method to cover voids present in a pipe prior to application of a remediation lining to the interior of the pipe. The term "void" shall be taken herein to refer to cracks, perforations, depressions, joints or any other similar defective portions of the inner pipe wall.

After cleaning the pipe using conventional methods, such as blasting, pigging, etc., it is most preferred to cover any voids that would negatively impact optimal creation of the remedial pipe ling. To achieve the task a taping apparatus or robot 10 is sent into the pipe. This apparatus 10 can be semi-autonomous, in which case the apparatus 10 is connected to an umbilical cord which provides it with the required operational power. Alternatively, the taping apparatus 10 may be self-powered using batteries and may communicate with wireless communication protocols.

The taping apparatus 10 comprises a transport assembly 11 and a taping assembly 20. The transport assembly 10 enables movement of the taping apparatus 10 through the pipe, whether under self-power or by being pulled through the pipe by a separate drive unit. Rolling members 12, such as treads, rollers, wheels or the like, are mounted around a central main body 14. Preferably, the rolling members 12 are connected to the main body 14 by extension/retraction assemblies 13 such that the rolling members 12 can be extended or retracted as required for proper fit within the pipe. The rolling members 12 are oriented such that the taping apparatus 10 moves longitudinally through the pipe.

The taping operation is preferably controlled remotely by a human operator, but alternatively suitable sensors and computer processing means may be provided whereby the taping operation is performed automatically. In the embodiment as shown, one or more navigation cameras 15 are positioned on the taping apparatus 10 to provide visuals of the pipe in front of the taping apparatus 10 to locate any voids that require taping, the visuals being provided to the remote operator via wired or wireless communication.

The taping assembly 20 is rotatable relative to the transport assembly 11, and comprises a rotatable drum housing 21, such that the taping assembly 20 is rotatably mounted to the transport assembly 11 such that rotation about a longitudinal axis coaxial with or parallel to the longitudinal axis of the pipe is enabled. A drum motor or actuator 22 is positioned, preferably, in the main body 14 with a rotating shaft extending into the taping assembly 20 to provide rotational movement. Suitable bearings and seals are provided between the transport assembly 11 and the taping assembly 20. The drum hosing 21 retains a spool 23 on which an adhesive-backed patching tape 90 is wound, the outer or free end of the tape 90 extending through a slot 24 in the drum housing 21. The spool 23 may freely rotate to allow the tape 90 to be pulled from the spool 23 by frictional force or powered feed rollers, or the spool 23 may be powered such that the tape 90 is fed by rotation of the spool 23. In the embodiment as shown, the spool 23 freely rotates and the tape 90 is unwound from the spool 23 by frictional forces when the tape 90 is applied to the pipe surface.

At least one patch camera 16 is mounted on the drum housing 21, the camera 16 providing visuals to the operator of a void that is to be taped over, as well as providing visuals during the taping operation to verify proper coverage of the void has been achieved. LED's or similar lighting members may be provided to illuminate the dark interior of the pipe.

The taping assembly 20 further comprises a robotic arm assembly 30, preferably mounted onto the exposed end of the rotating drum housing 21. The arm assembly 30 is affixed to the drum housing 21 so as to rotate in tandem with the drum housing 21, and is oriented to receive tape 90 from slot 24 and to perform the taping operation in the field of view of the camera 16. Alternatively, the camera 16 could be mounted directly onto the arm assembly 30. The arm assembly 30 comprises an extension member 31 and an arm motor or actuator 32, such that the extension member 31 of the arm assembly 30 may be extended or retracted as required to execute the taping operation.

The free or distal end of the arm assembly 30 comprises a tape applicator assembly 40 comprising a rocker bracket or mount 46, movement of the rocker bracket 46 being controlled by a bracket motor or actuator 33, the rocker bracket 46 being mounted to a shaft extending from a bracket motor 33 such that the rocker bracket 46 may be rocked or pivoted by operation of the bracket motor 33. The rocker bracket 46 is preferably curved and is oriented within a plane perpendicular to the longitudinal axis of the taping apparatus 10 and pipe, such that the curvature of the rocker bracket 46 extends circumferentially so as to be complementary to the curvature of the pipe wall. The tape applicator assembly 40 further comprises a press roller 43, a cutting member 45 and a tape retention member 44 mounted to the rocker bracket 46, all of which extend in the longitudinal or axial direction. The tape retention member 44 is a spring-biased rod or similar member that temporarily secures the free end of the tape 90 against the press roller 43, as seen in FIGS. 5 and 6, to prevent accidental retraction of the tape 90 onto the spool 23. The press roller 43 is adapted to press to the tape 90 against the inner wall of the pipe as the drum housing 21 and arm assembly 30 is rotated to apply the tape 90 over a void. Once sufficient tape 90 has been adhered to the pipe wall to cover the void, as confirmed by the visual information transmitted to the operator by camera 16, the rocker arm 46 is pivoted such that the cutting member 45, which may comprise a toothed blade or similarly functioning construct, contacts and severs the tape 90, after which the rocker bracket 46 is returned to the neutral orientation.

Most preferably, the tape applicator assembly 40 further comprises a longitudinally extending cleaning member 41 mounted to the rocker bracket 46, such as a fixed or roller brush, which removes loose debris, particles, dirt or the like in the area of the void prior to application of the tape 90 over the void. The arm assembly 30 also preferably comprises a longitudinally extending liquid absorption member 42 mounted to the rocker bracket 46, such as a sponge or absorbent pad, which absorbs moisture present in the area of the void prior to application of the tape 90.

In operation, the taping apparatus 10 is advanced through the pipe until a void needing coverage is noted by the operator, as seen through the navigational cameras 15 and/or the patch camera 16. The drum housing 21 is then rotated into the proper orientation relative to the void and the tape applicator assembly 40 is extended by actuation of the arm motor 32 such that the cleaning member 41 is brought into contact with the pipe wall. The drum housing 21 is then further rotated such that cleaning member 41 is moved circumferentially along the inner pipe wall, and further such that the liquid absorption member 42 makes contact, if one or both are present. As rotation continues, the press roller 43 is advanced toward the pipe wall such that the adhesive side of tape 90 is pressed onto the pipe wall over the void. After the end adheres to the pipe wall, friction acts to pull further tape 90 through slot 24 from the spool 23, such that a length of tape 90 is applied over the void. After the void is fully covered, as evidenced by visuals from the camera 16, the bracket motor 33 is actuated and the cutting member brought forward to sever the tape 90. The tape applicator assembly 40 is then retracted and the rocker bracket 46 is returned to the neutral orientation, the free end of the tape 90 being retained on the press roller 43 by the tape retention member 44 in proper position for contact with the pipe wall when the next void is to be repaired.

It is understood that equivalents and substitutions for certain elements and steps described above may be obvious to those of skill in the art, and therefore the true scope and definition of the invention is to be as set forth in the following claims.

We claim:

1. A taping apparatus adapted to apply tape over voids on an interior pipe wall, the pipe wall defining a circumferential and a longitudinal direction, the taping apparatus comprising:

a transport assembly adapted to move said apparatus through a pipe;

a rotatable taping assembly adapted to retain a roll of tape and apply said tape circumferentially over a void on the interior wall of the pipe, said taping assembly comprising an arm assembly and a tape applicator assembly;

said tape applicator assembly comprising a press roller, a spring-biased tape retention member securing said tape against said press roller, a cutting member and a circumferentially curved rocker bracket, wherein said press roller, said tape retention member and said cutting member are mounted to said rocker bracket.

2. The apparatus of claim 1, said taping assembly further comprising a drum housing, wherein said arm assembly is mounted to said drum housing and wherein said tape applicator assembly is mounted to said arm assembly.

3. The apparatus of claim 1, said tape applicator assembly further comprising a cleaning member mounted to said rocker bracket such that the interior wall of the pipe is cleaned prior to application of said tape.

4. The apparatus of claim 1, said tape applicator assembly further comprising a liquid absorption member mounted to said rocker bracket between said cleaning member and said press roller such that moisture on the interior wall of the pipe is absorbed prior to application of said tape.

5. The apparatus of claim 1, wherein said arm assembly is extendable and retractable, said apparatus further comprising a drum motor adapted to rotate said taping assembly and an arm motor adapted to extend and retract said arm assembly.

6. The apparatus of claim 5, further comprising a navigational camera.

7. The apparatus of claim 1, said tape applicator assembly further comprising a bracket motor adapted to pivot said rocker bracket to bring said cutting member into contact with said tape.

8. The apparatus of claim 1, said taping assembly further comprising a patch camera.

9. The apparatus of claim 1, wherein said wherein said press roller, said tape retention member and said cutting member extend in the longitudinal direction.

10. A taping apparatus adapted to apply tape over voids on an interior pipe wall, the pipe wall defining a circumferential and a longitudinal direction, the taping apparatus comprising:
a transport assembly adapted to move said apparatus through a pipe, said transport assembly comprising rolling members mounted on a main body;
a rotatable taping assembly adapted to apply tape circumferentially over a void on the interior wall of the pipe, said taping assembly comprising a drum housing adapted to retain said tape on a spool, an extendable and retractable arm assembly and a tape applicator assembly mounted to said arm assembly;
said tape applicator assembly comprising a pivotally mounted, circumferentially curved rocker bracket and a press roller, a spring-biased tape retention member securing said tape against said press roller, and a cutting member mounted to said rocker bracket, wherein said press roller, said tape retention member and said cutting member extend longitudinally.

11. The apparatus of claim 10, said tape applicator assembly further comprising a cleaning member and a liquid absorption member mounted to said rocker bracket.

12. The apparatus of claim 10, further comprising a drum motor adapted to rotate said taping assembly and an arm motor adapted to extend and retract said arm assembly.

13. The apparatus of claim 12, said tape applicator assembly further comprising a bracket motor adapted to pivot said rocker bracket to bring said cutting member into contact with said tape.

14. The apparatus of claim 10, said taping assembly further comprising a patch camera.

15. The apparatus of claim 14, further comprising a navigational camera.

16. A taping apparatus adapted to apply tape over voids on an interior pipe wall, the pipe wall defining a circumferential and a longitudinal direction, the taping apparatus comprising:
a transport assembly adapted to move said apparatus through a pipe, said transport assembly comprising rolling members mounted on a main body;
a rotatable taping assembly adapted to apply tape over a void on the interior wall of the pipe, said taping assembly comprising a patch camera, a drum housing adapted to retain said tape on a spool, an extendable and retractable arm assembly and a tape applicator assembly mounted to said arm assembly, said tape applicator assembly comprising a rocker bracket and a press roller, tape retention member and cutting member each mounted to said rocker bracket;
wherein said rocker bracket is oriented circumferentially and curved, and wherein said press roller, said tape retention member and said cutting member extend longitudinally from said rocker bracket;
a drum motor adapted to rotate said taping assembly, an arm motor adapted to extend and retract said arm assembly, and a bracket motor adapted to pivot said rocker bracket to bring said cutting member into contact with said tape;
said apparatus further comprising a navigational camera.

17. The apparatus of claim 16, wherein said tape applicator assembly further comprises a cleaning member and a liquid absorption member mounted to said rocker bracket.

18. A method of applying tape over a void present on the interior wall of a pipe, said pipe defining a circumferential and a longitudinal direction, comprising the steps of:
navigating a taping apparatus adapted to apply tape circumferentially over voids on an interior pipe wall through a pipe, the taping apparatus comprising: a transport assembly adapted to move said apparatus through a pipe, said transport assembly comprising rolling members mounted on a main body; a rotatable taping assembly adapted to apply tape over a void on the interior wall of the pipe, said taping assembly comprising a navigational camera, a patch camera, a drum housing adapted to retain said tape on a spool, an extendable and retractable arm assembly and a tape applicator assembly mounted to said arm assembly, said tape applicator assembly comprising a pivotable, circumferentially curved rocker bracket and a press roller, tape retention member and cutting member each mounted to said rocker bracket and extending in the longitudinal direction;
a drum motor adapted to rotate said taping assembly, an arm motor adapted to extend and retract said arm assembly, and a bracket motor adapted to pivot said rocker bracket to bring said cutting member into contact with said tape;
locating a void;
aligning said tape applicator assembly with said void;
extending said tape applicator assembly and rotating said taping assembly such that said tape is pulled from said spool and applied over the void;
pivoting said rocker bracket and cutting said tape with said cutting member; and
retracting said tape applicator assembly.

19. The method of claim 18, wherein said step of locating said void and aligning said tape applicator assembly with said void is accomplished utilizing visuals produced by said patch camera and/or said navigational camera.

* * * * *